INVENTOR.
JACQUES BEHMOIRAS
BY
ATTORNEY.

Nov. 2, 1965  J. BEHMOIRAS  3,216,015
RECORDERS
Filed Feb. 11, 1963  7 Sheets-Sheet 5

INVENTOR.
JACQUES BEHMOIRAS
BY Arthur H. Swanson
ATTORNEY.

Nov. 2, 1965

J. BEHMOIRAS 3,216,015

RECORDERS

Filed Feb. 11, 1963

INVENTOR.
JACQUES BEHMOIRAS
BY Arthur H. Swenson
ATTORNEY.

UNITED STATES PATENT OFFICE

3,216,015
RECORDERS
Jacques Behmoiras, Upper Darby, Pa., assignor to Honeywell Inc., a corporation of Delaware
Filed Feb. 11, 1963, Ser. No. 257,599
8 Claims. (Cl. 346—46)

The present invention relates to an instrument for printing a plurality of records on a chart. This is done by the use of a print wheel that is indexed for each measurement to bring into printing relation with the chart a type character selected to identify the variable being measured, which print wheel is moved to a position along the chart corresponding to the instantaneous value of the variable being measured, and then is pressed thereagainst momentarily. If desired, each of the type characters can be made different in form. A single color may be used, or, if desired, each character can be printed in a different colored ink.

It is an object of this invention to provide an ink wheel pad for inking the type characters on the type or print wheel and to mount this ink pad wheel on a chassis independently of the mounting for the print wheel. This provides a light and stronger machine suitable for high speed printing. This ink pad wheel obviates the limitations to the number of colors that can be printed by a single instrument and permits as many colors as there are type characters to be employed. In the embodiment shown herein there are twenty-four type characters and eight ink pads, so that eight groups each of three type characters are each printed in the same color which differs from the colors of the other seven groups. Each type character is synchronized with one ink pad so that, each time a type character is selected, the proper ink pad is also selected.

It is a further object of this invention to provide means whereby the print wheel may be indexed at different angles.

An additional object of this invention is to provide selectively operable means whereby the print wheel may be connected to print in sequence the changing values of a single variable, or to print the changing values of more than one but less than all the variables the machine can accommodate, or to print the changing values of all the variables the machine can accommodate.

Furthermore, it is an object of this invention to operate the input selector switch by means of a telescoping shaft.

A better understanding of the present invention may be had from the following detailed description when read in connection with the accompanying drawings, in which.

Figure 1:
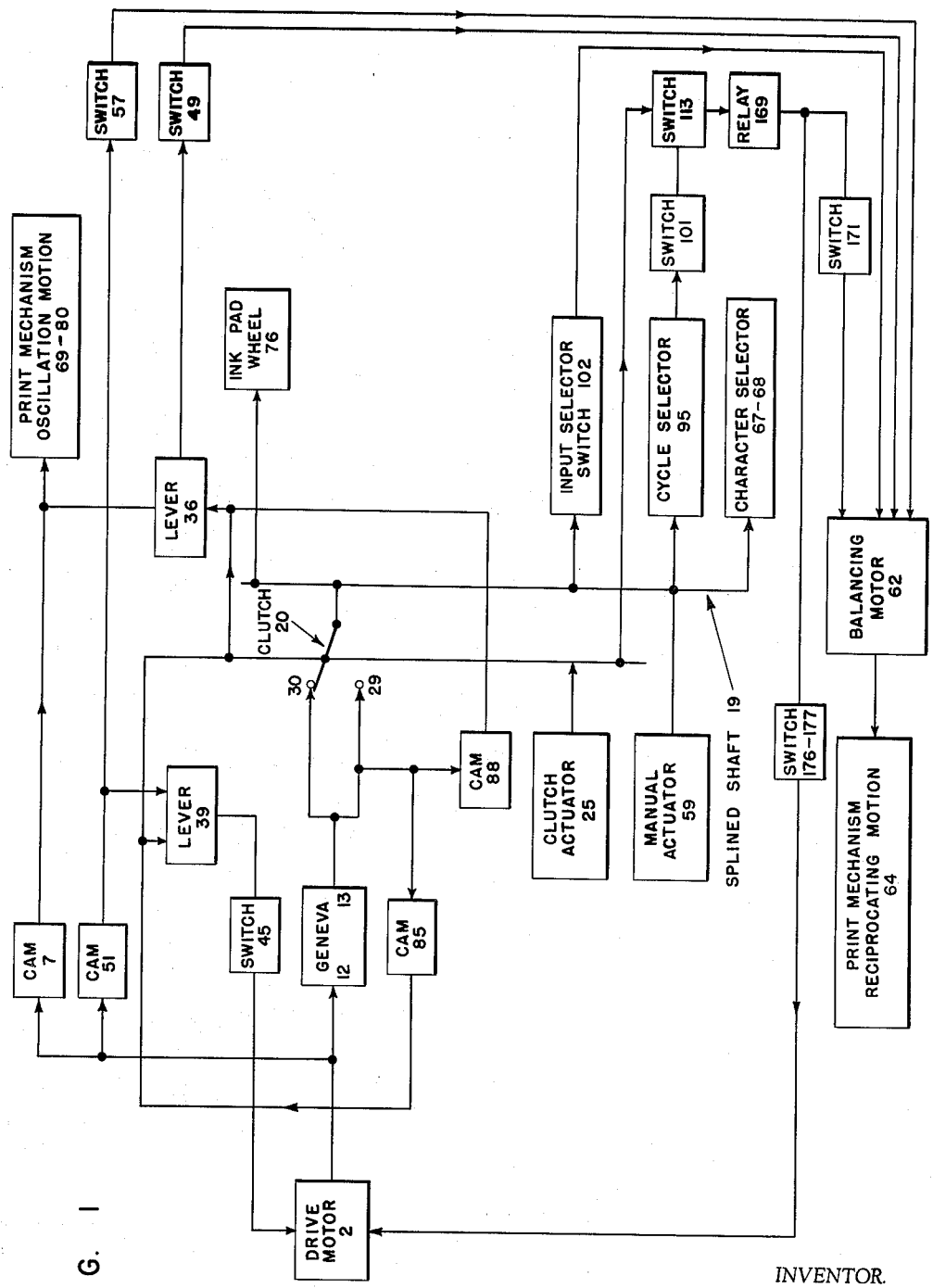
FIG. 1 is a block diagram showing the cooperation between the elements which make up this instrument.

The instrument of this invention is an improvement on known types of multiple recording instruments, examples of which are shown in the following United States Patents: 2,328,664, C. B. Moore, Sept. 7, 1943; 2,423,480, J. A. Caldwell, July 8, 1947; and 2,791,481, A. H. Jordan, May 7, 1957.

Reference is made to these patents for a description of the various details of the instruments over which the present invention is an improvement.

The instrument of this invention comprises a rigid chassis 1 in which the various parts of the instrument, such as the indexing and printing mechanism and the electric switches, are mounted. A synchronous, electric drive motor 2 turns in one direction and revolves constantly through each period of time during which it is energized. In each cycle of its operations, the motor 2 moves the printing element (the print or type wheel 70) into and out of engagement with the record chart which passes over chart drum C and, thereafter, moves the input selector switch 102 to disconnect one input circuit from the measuring circuit and to connect another input to the measuring or bridge circuit, which forms part of this instrument and which controls a balancing motor 62. After a sufficient time to allow the bridge circuit to come into balance, the print wheel 70 is caused to engage with the record chart and to make a record thereon.

Figure 5:
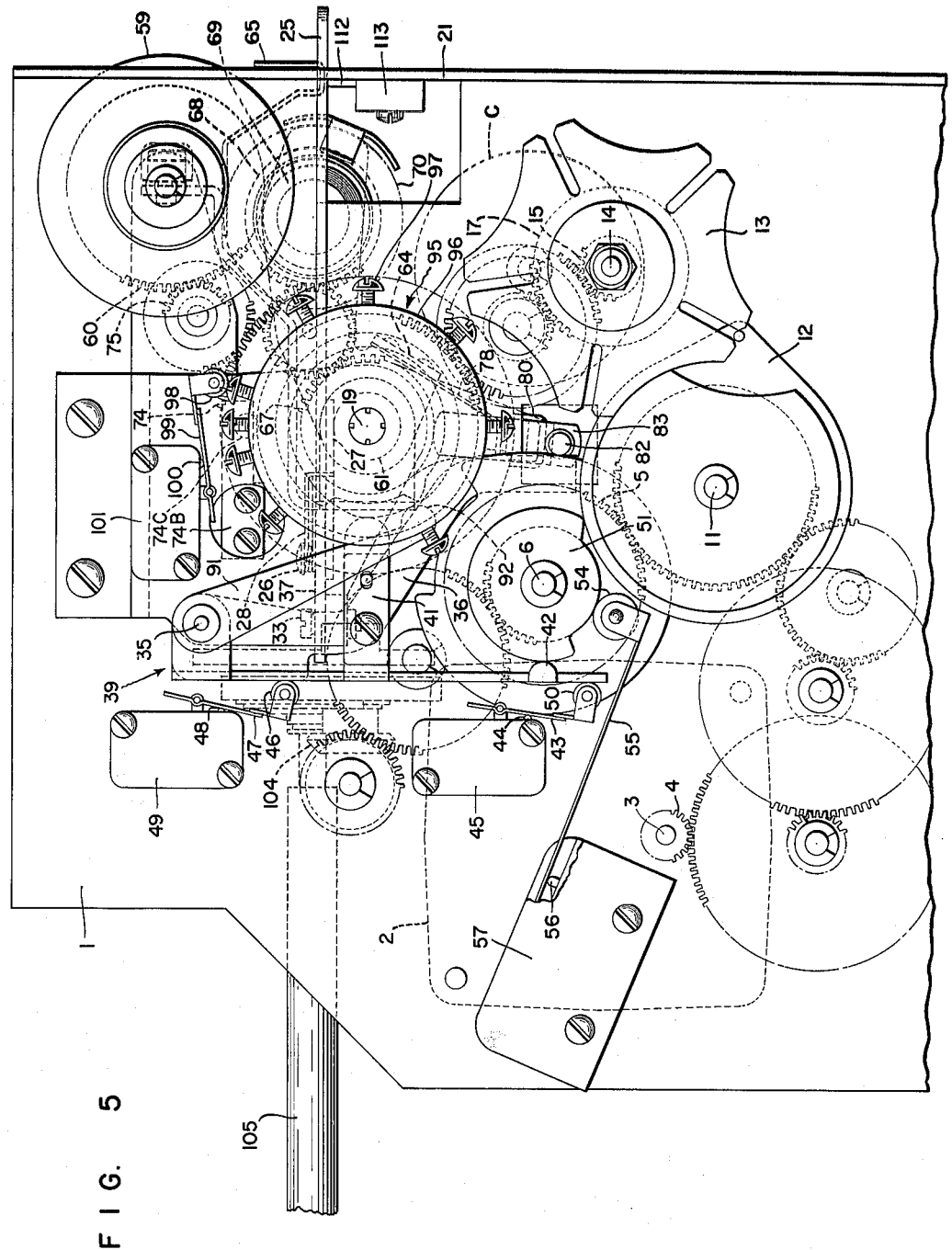
FIG. 5 is a side or end elevation.

FIG. 5 shows that motor 2 has an output shaft 3 on which is connected an input gear 4 of a train of gearing which has an output gear 5 on shaft 6.

Figure 6:
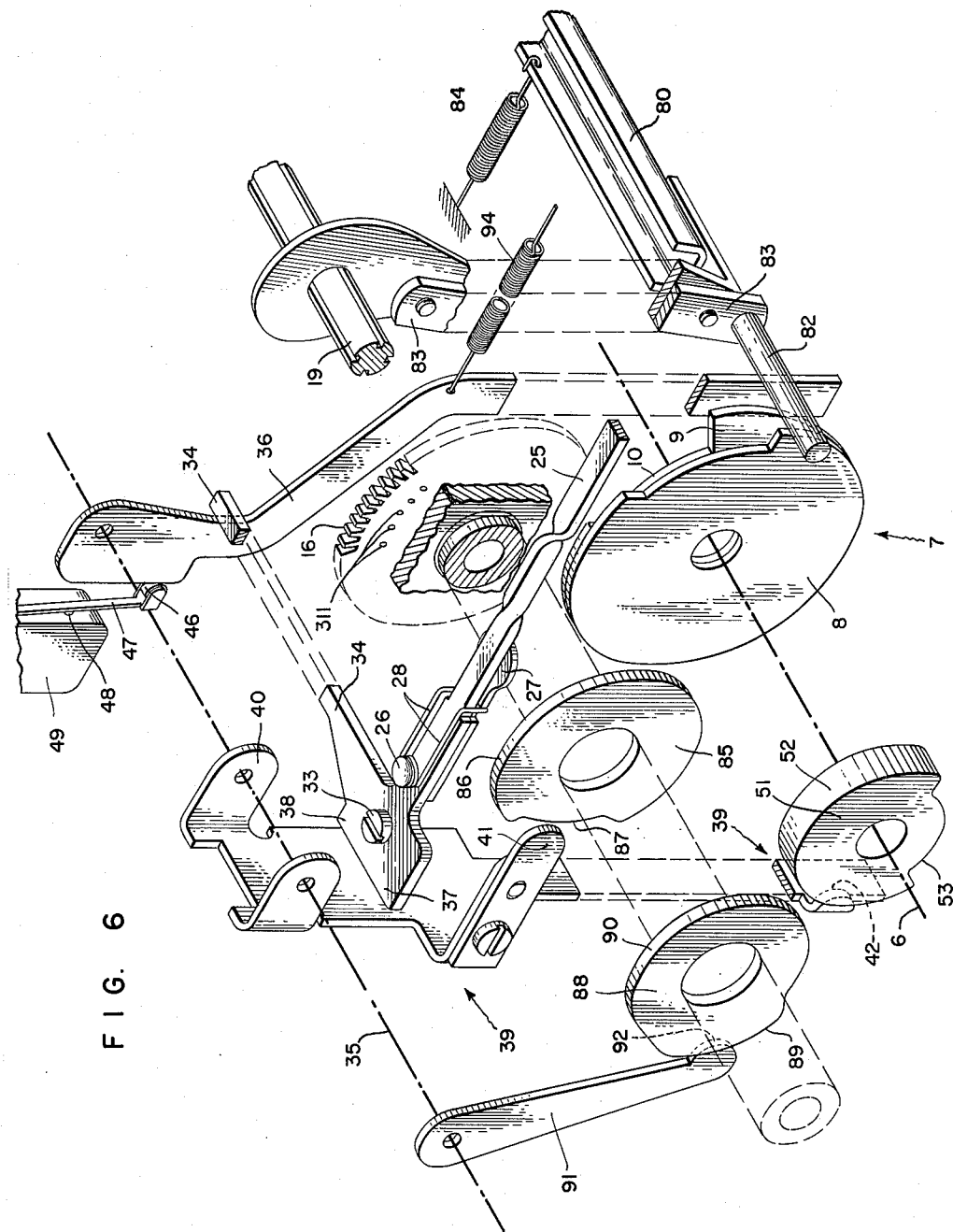
FIG. 6 is an exploded, isometric view of a portion of the instrument.

As is best seen in FIG. 6, on shaft 6 is mounted an ink-and-print cam, generally indicated 7, and comprising a pair of cam discs 8 and 9 rotatable relative to each other so as to vary the length of the low portion 10 of the cam which is located between two radial faces of the discs 8 and 9.

Referring to FIG. 5, gear train 4–5 includes a shaft 11 on which is mounted a crank arm 12 forming part of means for converting continuous rotation into intermittent rotation. Crank arm 12 drives Geneva gear 13 which is mounted on chassis 1 by means of a shaft 14 to which is connected for rotation therewith an input gear 15 (FIG. 3) which forms the input to a train of gearing which terminates in an output gear 18 mounted to rotate freely on splined shaft 19. Also fixedly mounted on shaft 14 for rotation therewith is a second input gear 17 which forms the input to a train of gearing which terminates in gear 16 mounted for free rotation on splined shaft 19.

Means are provided for connecting drive motor 2 through crank arm 12 and Geneva gear 13 to splined shaft 19 so that motor 2 drives spline shaft 19 with an intermittent motion at a speed depending upon which of the trains of gearing 15, 18, or 17, 16 is selected. These means comprise a clutch, generally indicated 20 (FIG. 4), and having a horizontal handle 25 which projects through front plate 21 on chassis 1. Plate 21 has three notches in it. Handle 25 may be located in any one of these notches so as to be retained by plate 21 in its selected position. Handle 25 has a pin 26 on it on which is pivoted a clutch plate operator 27 having a rounded face which cooperates with one vertical face of each of a pair of clutch plates 29 and 30 which are connected together by a splined bushing 61 on splined shaft 19. U-shaped spring 28 biases clutch plate operator 27 towards its mid-position of its path of travel. Each of clutch plates 29 and 30 has a pin 31 or 32 on it. Pins 31 and 32 are each adapted to enter one of a series of holes in gears 16 or 18, respectively. Holes 311 in gear 16 shown in FIG. 6. When pin 31 or pin 32 is connected to gear 16 or 18, respectively, the corresponding plate is connected to the splined shaft 19 so that the splined shaft is driven thereby with an intermittent motion. When handle 25 is in intermediate position, splined shaft 19 is disconnected from motor 2 and is at rest.

Figure 4:
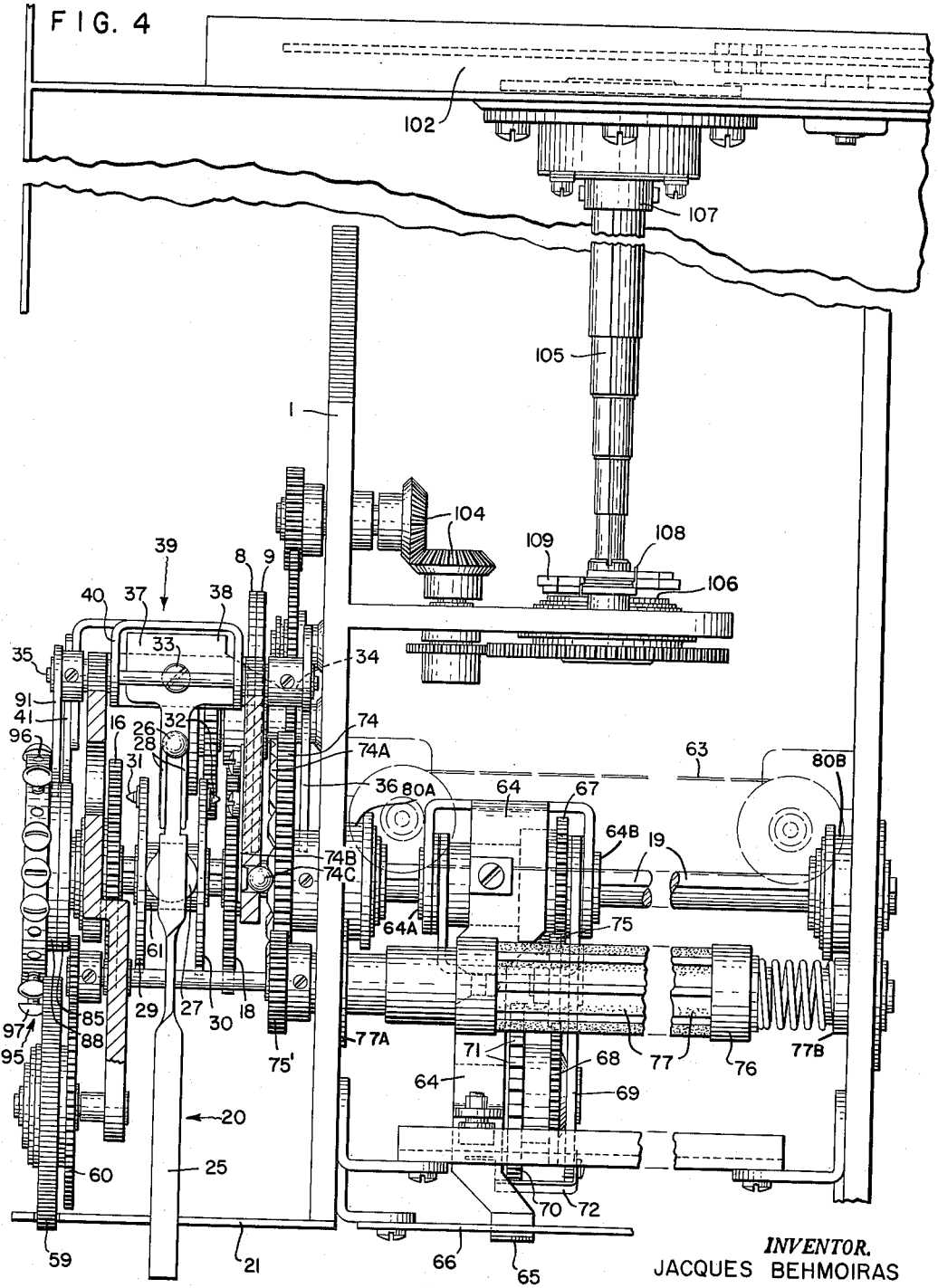
FIG. 4 is a top or plan view.

Clutch handle 25 is pivoted on chassis 1 by means of a vertical pivon pin 33. Handle 25 has arm 34 on it which projects to the right, as seen in FIGS. 4 and 6, and is adapted to engage with and actuate lever 36 which is mounted in chassis 1 by shaft 35 and which is fastened against rotation on shaft 35. Arm 34 holds lever 36 out of engagement with pin 82 shown in FIG. 6.

Handle 25 also has on it shoulder 37 and 38. When handle 25 is rocked from its mid-position into one of its end positions, shoulder 37 or shoulder 38 engages with a substantially vertical face of lever 39 which is mounted for oscillatory motion on shaft 35 by means of perforated ears 40. Lever 39 has on it a cam face 41 which cooperates with cam 85 and a cam face 42 which cooperates with cam 51. Lever 39 engages with cam follower or roller 50 (FIG. 5). Roller 50 is pivotally mounted on switch arm or lever 43 which engages with actuator 44 of a small snap electric switch 45. Switch 45 may be of the type shown in one of the following United States Patents: 1,780,758, H. G. Leupold; 2,612,368, S. G. Ransome; and 1,668,974, A. J. Mottlau.

FIG. 6 shows that lever 36 engages with cam follower or roller 46 pivotally mounted on a switch arm or lever 47 which engages with the actuator 48 of a small snap electric switch 49 of the same type as the switch 45.

Figure 2:
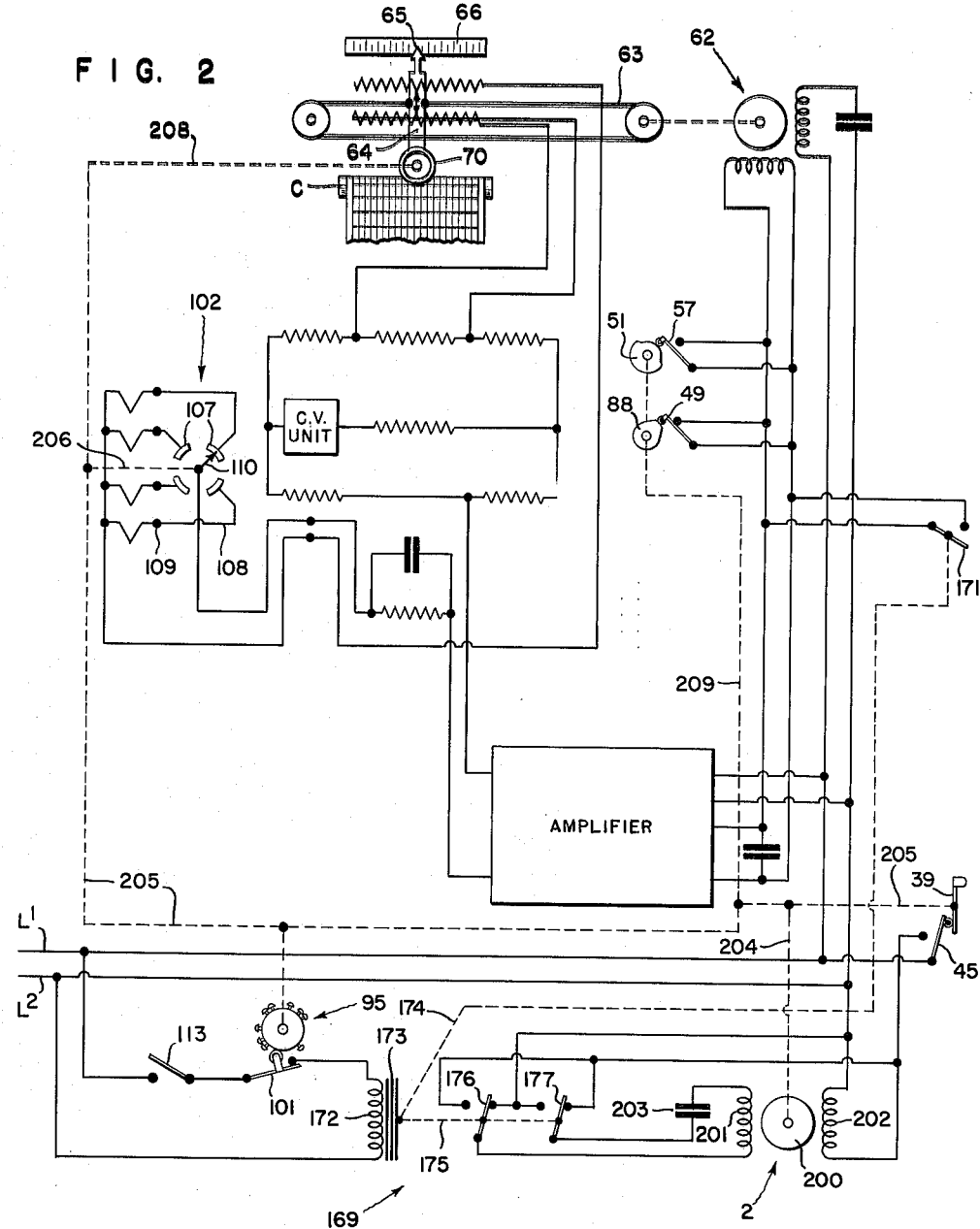
FIG. 2 is a diagram showing the mechanical and electrical connections between the various parts of the instrument of this invention.

FIG. 2 shows that switch 49 is connected in parallel with switch 57 and with the control winding of balancing motor 62 so as to apply dynamic breaking to balancing motor 62 when switch 49 is closed.

FIG. 6 shows that shaft 6 has a cam 51 fast on it. Cam 51 has a high surface 52 and a low surface 53 which engage with cam follower 42 and thereby actuate lever 39 and consequently switch 45.

FIG. 2 shows that switch 45 is connected in series with the one of the alternating current leads L1 and the winding 202 of the drive motor 2 and thereby controls the application of electricity to and, consequently, the operation of drive motor 2.

FIG. 5 shows that cam 51 also engages with cam follower or roller 54 pivotally mounted on a switch arm or lever 55 which engages with actuator 56 of a small snap electric switch 57 of the same type as switch 45.

FIG. 2 shows that switch 57 is connected in parallel with the control winding of the balancing motor 62. Therefore, when switch 57 is closed, the control winding is short circuited and dynamic breaking is applied to motor 62 so as to cause it to stop quickly and to remain stopped.

Means are provided for manually actuating the character selector 95, the input selector switch 102, and ink pad wheel 76 simultaneously. This manually operated actuator 59 (FIG. 5) comprises a knurled disc which projects through the front of chassis 1 and which is fastened to an input gear 60 which forms the input to a train of gearing which terminates in gear 74 on splined shaft 19. Rotation of actuator 59 by hand thus turns the mechanisms which are connected to splined shaft 19. More specifically, the manually-operated actuator 59 and its coacting parts 60, 75, 74, 104, 109, 108, 105, 107 are employed to set the input selector switch 102 while the actuator 59 with its co-acting parts 60, 75, 74, 19 is employed to set the character selector 95 and this same actuator 59 with its co-acting parts 60, 75 is employed to simultaneously set the position of the ink pad wheel 76.

Figure 3:
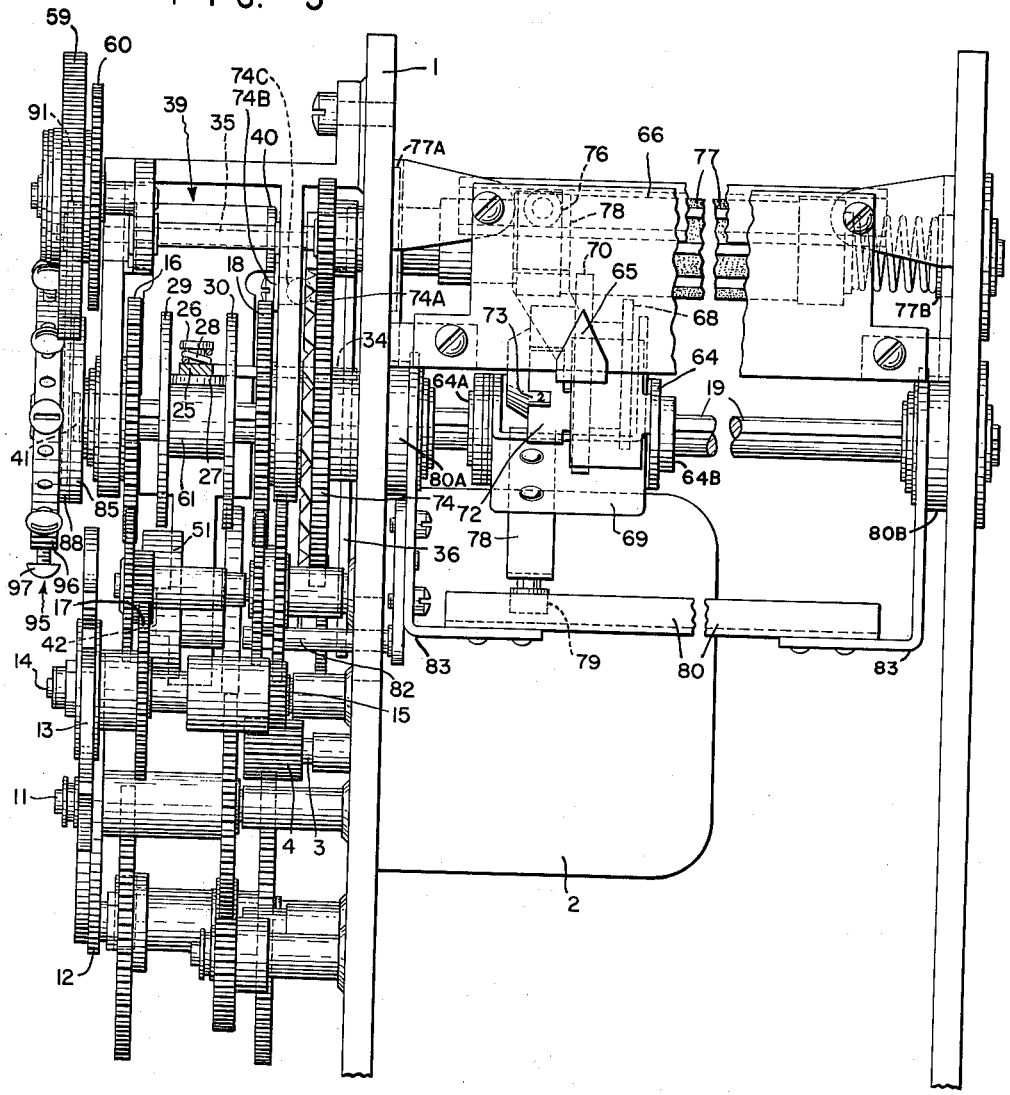
FIG. 3 is a front elevation with parts broken away transversely of the instrument.

FIG. 2 shows that balancing motor 62 has an output shaft which has connection with cable 63 which is trained over pivotally mounted pulleys and is connected to sliding carriage 64 mounted for reciprocating motion on splined shaft 19. Sliding carriage 64 has pointer 65 on it which cooperates with stationary scale 66 on chassis 1 to indicate the value of the input which is being measured and which is about to be recorded. Mounted on sliding carriage 64 and connected to splined shaft 19 so as to be rotated thereby is an input gear 67 (FIG. 4) which forms the input of a driven gear 75 of a train of gearing which terminates in an output gear 68 which is mounted for rotation on pivoted carriage 69 and which has connection with print or type wheel 70 on which are mounted a plurality of type characters 71. Cover 72 covers the type characters 71 and has a notch 73 in it (FIG. 3). A plurality of characters are mounted or marked on the type wheel 70 and are related to the type characters 71 in such a way that the character which is visible through the notch 73 corresponds with the type character which is about to be inked and printed.

Mounted on splined shaft 19 (FIG. 4) so as to rotate shaft 19 is an input gear 74 which has a plurality of teeth 74A on one vertical face thereof. Teeth 74A cooperate with a ball 74C which is stressed by spring 74B to form an indexing detent which insures that input gear 74 and the mechanism actuated thereby is each accurately located in the desired position when clutch 25 is disengaged.

Input gear 74 forms the input to a train of gearing which terminates in an output gear 75' which is mounted on ink pad wheel 76 having a plurality of ink pads 77 on its outer surface. The ends of the cylindrical ink pads 77 are mounted for rotary motion on support members 77A, 77B.

On type carriage 69 (FIG. 3) pivotally mounted on bearing 64A, 64B is a depending rocker arm 78 having, at its lower end, a roller 79 rotatably mounted thereon. Roller 79 rides in a channel 80 which carries a horizontal pin 82 at the left hand end of it. Channel 80 is pivotally mounted by means of bearings 80A, 80B on splined shaft 19 by means of supports 83 at the ends of the channel 80. Supports 83 have limited rotary movement on splined shaft 19. A spring 84 or gravity biases channel 80 in a clockwise movement towards the ink and the print cam 7 and the lever 36. A spring 94 (FIG. 6) is fastened at one end to the chassis 1 and at the other end to lever 36 so as to bias lever 36 for counter-clockwise movement about the axis of shaft 35 at the pivot and into engagement with the pin 82.

The instrument thus far described is adapted to connect each of the input circuits, shown in FIG. 2 as thermocouples, to the measuring or balancing circuit and consequently to the balancing motor 62. This causes each of the measuring circuits to be measured and recorded in sequence. This is done by moving handle 25 to the right, as seen in FIG. 4, thereby causing clutch plate 30 to move to the right and causing pin 32 to enter one of the holes in gear 18. Gear 18 has in it a number of holes (in this case twenty-four) corresponding to the number of type characters 71 on the type wheel 70. Each succeeding input circuit is printed in succession in a regular cycle as gear 18 turns once for each complete rotation of the type wheel 70 so that each of the type characters 71 has been printed during the cycle. The inking is done by the rocking assembly which pushes print wheel 70 up and against ink pad wheel 76, said inking being caused by the high point 9 on cam 7.

In other words, when clutch 20 is moved so that clutch plate 30 engages with gear 18, one type character is printed for every revolution of ink-and-print cam 7 and for one-twenty-fourth of a revolution of print wheel 70. At the same time ink pad wheel 76 is moved by one eighth of a revolution through gears 74 and 75'.

However, if desired, means may be provided for measuring and printing only one of the input circuits or for measuring and recording any number of input circuits less than the number of input circuits which the instrument can accommodate.

Gear 16, which is freely rotatable on splined shaft 19 (FIG. 6), has fast on it, so as to be rotated thereby, a cam 88 having a high surface 89 and a low surface 90 cooperating with a rounded, cam-following surface 92 on a lever 91 fast on shaft 35 to which lever 36 is also fixedly connected. Cam 88 is therefore adapted to hold lever 36 against the bias of spring 94 out of engagement with pin 82. This permits pin 82 to enter the notch 10 in the ink-and-print cam 17 whenever the printing cycle is desired.

Gear 16, which is freely rotatable on splined shaft 19 also has fast on it cam 85 having a high surface 86 and a low surface 87. These surfaces cooperate with a cam-follower 41 on lever 39. Cam 85 thus actuates lever 39 and switch 45 actuated by lever 39.

Means are provided for manually selecting the type character 71 which is next to be printed. Handle 25 of clutch 20 is moved to its intermediate or neutral position. FIG. 6 shows that, when handle 25 is in mid-position, neither shoulder 37 nor shoulder 38 engages lever 39. Another type character 70 can then be manually selected by turning actuator 59 (FIG. 5) by hand. Rotation of actuator 59 by hand turns splined shaft 19 and input gear 67 which actuates output gear 68 so as to rotate the print or type wheel 70 until the desired type character 71 is in print position. Handle 25 of clutch 20 is then moved to engage clutch plate 30 with gear 18 and to resume cyclic or sequential printing as described above.

If it is desired to print only one of input circuits which the instrument can accommodate, the procedure is as follows. The point which is to be printed may be selected manually as explained in the preceding paragraph. Handle 25 of clutch is then actuated so that pin 31 on clutch plate 29 enters one of the twenty-four holes 311 in gear 16. This causes print wheel 70 to turn one hundred twenty degrees, which permits the same type characters 71 to engage with corresponding ink pad 77 on the ink pad wheel 76. On the third indexing cycle, the type character 71 returns to the printing position.

The printing of less than the total number of type characters 71 which the machine can accommodate is accomplished by means of a cycle selector 95 (FIG. 5) which comprises a disc 96 having a plurality of screws 97 or other drive means on the surface thereof. Each of screws 97 is adapted to engage in succession with a cam follower or roller 98 pivotally mounted on a switch arm or lever 99 which engages with the actuator 100 of an electric switch 101 of the type shown of the same type as switch 45.

FIG. 2 shows that the switch 101 is connected in series with switch 113 and with the alternating current lines L1 and L2 and coil 172 of a relay 169. Relay 169 has an armature 173 under the control of coil 172. A mechanical connection 174 connects armature 173 to a switch blade 171. A second mechanical connection 175 connects armature 173 to switch blades 176 and 177 which are connected between alternating current lead L2 and the coils 201 and 202 which cooperate with the rotor 200 of drive motor 2. Depending upon the position of switch blades 176 and 177 drive motor 2 drives the mechanism through a gear box (not shown) at high or low speed.

FIGS. 2 and 4 show the input switch 102 and means for actuating input switch 102. FIG. 4 shows that these means include gear 74 fast on splined shaft 19 and forming the input gear to a train of gearing of bevel gears 104 which drive a telescoping and splined shaft 105 on which are mounted rotary contacts 110. In FIG. 2 these means are indicated by the dashed lines 204, 205, and 206. Means for rotating type wheel 70 are indicated by dashed lines 208. Means for actuating cams 51 and 88 are indicated by dashed line 209. Thus selector switch 102 can be mounted on a fixed case and chassis 1 can be moved in and out of the case without losing relation to the selector switch. Said telescoping splined shaft 105 is connected to input gear 106 and to rotary contacts 110 by two universal joints 107 and 108. A tweezer system 109 connects and/or disconnects telescoping shaft 105 from gear 106 if necessary.

FIGS. 2 and 5 show that switch 113 (of the same type as switch 45) is mounted on chassis 1 and has an actuator 112 which projects into the path of handle 25 so that, when the handle 25 is in its right hand position, switch 113 is closed. Switch 113 is connected in series with switch 101 so that, when switch 113 is closed, switch 101 is operative under the control of cycle selector 95. When handle 25 is in the center position or in the left hand position, the cycle selector 95 is inoperative.

When the printing of only a selected number of input signals is desired, screws 97 are inserted in desired position and lever 25 is pushed to the right. Then cycle selector 95 will or will not actuate switch 101. In the absence of a screw 97, relay 169 is energized and activates switch blades 176, 177 which switch the motor to high speed. The high speed of the cam 7 results in the overshooting of printing slot 10 by pin 82 and thus no printing occurs for that point. At the same time, relay 169 activates switch blade 171 which prevents the balancing motor 62 from moving. When the roller part 98 of switch 101 is in contact with a screw 97, the relay circuit is open and the printing sequence is normal.

Figure 7:
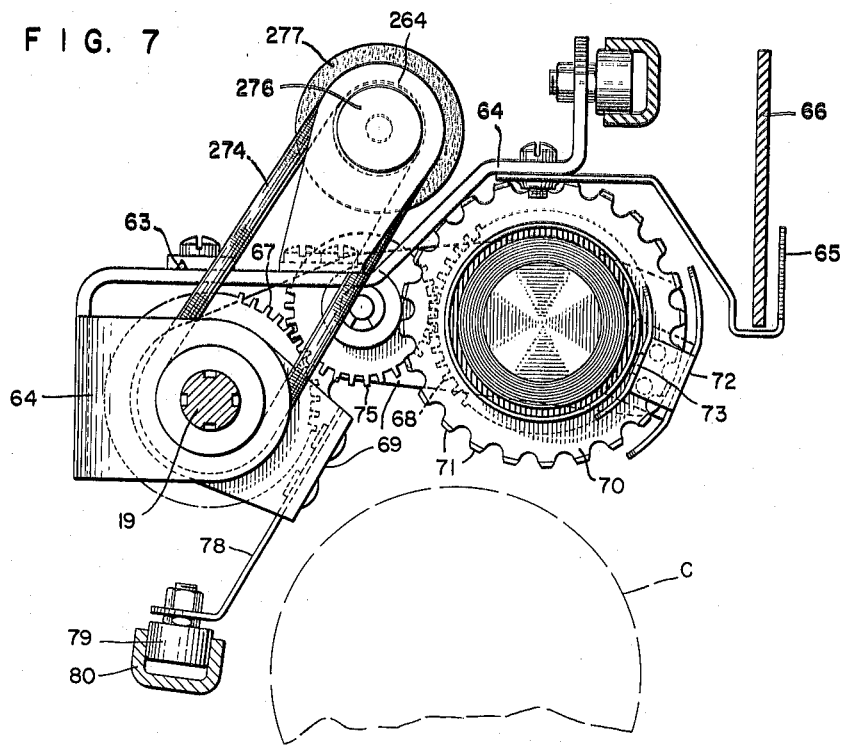
FIG. 7 is a side or end elevation of a modified form of ink pad wheel and ink pad.
Figure 8:
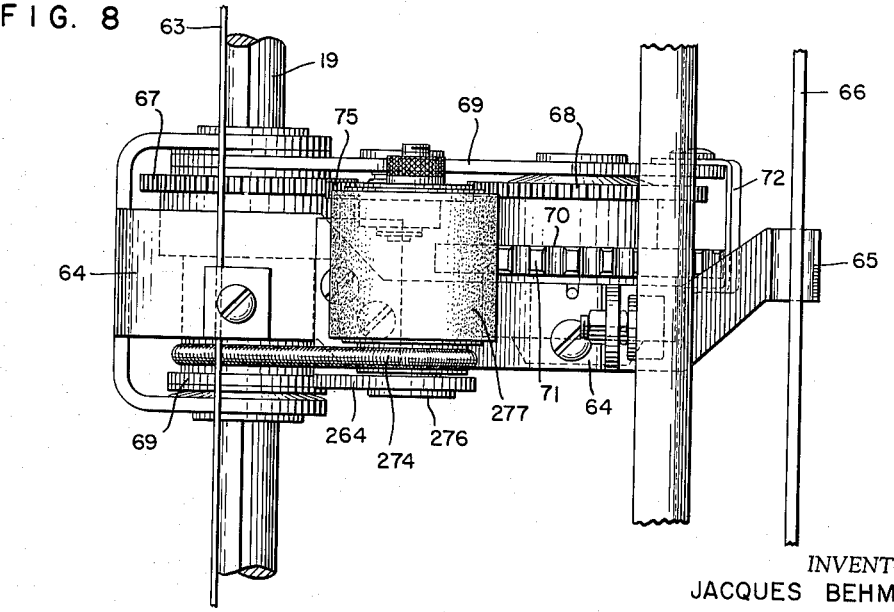
FIG. 8 is a top or plan view of the modification shown in FIG. 7.

FIGS. 7 and 8 show a modified form of ink pad wheel and ink pad. In the modification shown in FIGS. 1 through 6, ink pad wheel 76 and the ink pads 77 thereon extend for the full length of the path of travel of the printing mechanism (print or type wheel 70). In the modification shown in FIGS. 7 and 8, print wheel 276 and the print wheel pad 277 are short.

Cable 63, which is driven by balancing motor 62 (FIG. 2), is connected to sliding carriage 64 mounted for reciprocating motion on splined shaft 19. Sliding carriage 64 has pointer 65 on it which cooperates with stationary scale 66 on chassis 1 to indicate the value of the input which is being measured and which is about to be recorded. Mounted on sliding carriage 64 and connected to splined shaft 19 so as to be rotated thereby is an input gear 67 which forms the input to a train of gearing which terminates in an output gear 68 which is mounted for rotation on a pivoted carriage 69 and which has connection with a print or type wheel 70 on which are mounted a plurality of type characters 71. Cover 72 covers the type character 71.

Sliding carriage 64 has an upstanding arm 264 on it. In arm 264 is mounted an ink pad wheel 276 having an ink pad 277 forming its outer surface and overlying the type characters 71 on type wheel 70.

Rocker arm 78 depends from the pivoted carriage 69 and has, at its lower end, a roller 79 rotatably mounted on it. Roller 79 rides in a channel 80 which is mounted on splined shaft 19 so as to have limited rocking motion on splined shaft 19.

The mode of operation of the modification shown in FIGS. 7 and 8 is the same as the modification shown in FIGS. 1 through 6. When channel 80 is rocked clockwise, as seen in FIG. 7, type carriage 69 also rocks and, consequently, rocks type wheel 70 carried thereby. A selected one of the type characters 71 on type wheel 70 engages with the chart passing over the chart drum C and makes a record thereon.

Channel 80 is next rotated counter-clockwise beyond its original position and lifts type carriage 69 counter-clockwise, as seen in FIG. 7, so that the selected one of the type characters 71 on the type wheel 70 engages with the surface of ink pad 277 and receives ink therefrom.

What is claimed is:

1. In an instrument for printing a plurality of records on a chart, a chassis, a continuously rotating motor mounted in said chassis, means driven by said motor for converting continuous rotation into intermittent rotation, a splined shaft mounted for rotation in said chassis and intermittently rotated by said means, bearing members mounted for independent rotary movement on the splined shaft, a print wheel mounted on said bearing members for circumferential rocking movement about said splined shaft, gearing connecting said print wheel to said splined shaft so that rotation of said splined shaft rotates said print wheel, an ink pad wheel mounted for rotation about a fixed axis in said chassis, ink pads on said wheel, said wheel having its outer inking surface in spaced-apart relation with the print wheel, gearing connecting said ink pad wheel to said splined shaft so that rotation of said splined shaft rotates said ink pad wheel, a rocker arm and channel pivotally mounted on the bearing members that are mounted on the splined shaft and connected to said print wheel to provide a rocking movement to said print wheel about the bearing members, and an ink-and-print cam driven by said motor and connected to drive said rocker arm and said rocker channel so as to contact said print wheel with one of the ink pads on said ink pad wheel and thence into contact with the chart.

2. In an instrument according to claim 1, wherein an input-selector-switch is connected to and driven by said splined shaft, a fixed case is employed and said input-selector-switch is mounted on said fixed case and driven by an input gear mounted on said chassis which, in turn, can be moved and slid in and out in relation to the case and wherein a telescoping splined shaft is connected between said input gear and said input-selector-switch and forming part of the means whereby said input gear drives said input-selector-switch.

3. In a recorder for printing records on a chart, a print carriage having a rocking part and a non-rocking part, an ink pad wheel mounted on the non-rocking part of said print carriage, ink pads on said ink pad wheel, a print wheel mounted on the rocking part of the carriage and being positioned adjacent the ink pad wheel for rocking movement into and out of physical contact therewith, and means on the print carriage connecting said ink pad wheel and said print wheel, so that said print wheel and said ink pad wheel rotate after the print wheel has been rocked into contact with the ink pad wheel and has been rocked into contact with the chart to make a printed record.

4. In an instrument according to claim 1, a manually operable clutch connected between the means for converting continuous rotation into intermittent rotation and said splined shaft, for connecting said splined shaft to or disconnecting said splined shaft from said last mentioned means.

5. In an instrument according to claim 4, a knurled disc which, when said manually operable clutch disconnects said splined shaft from said means, can bring into position a desired character of the print wheel corresponding to a certain input on the selector switch in such a manner that, when said manually operable clutch connects said splined shaft to said means, the character selected will be the first to be balanced and printed in a normal printing sequence, or will print, balance and ink continuously only the character and input selected.

6. In an instrument for printing a plurality of records on a chart in response to the instantaneous value of any one or more of a plurality of variables measured by said instrument, a chassis, a continuously rotating drive motor mounted on said chassis, means driven by said drive motor for converting continuous rotation into intermittent rotation, a splined shaft mounted for rotation in said chassis and intermittently rotatable by said means, a print wheel having a plurality of type characters on it and mounted for freely rocking motion on about said splined shaft, gearing connecting said print wheel to said splined shaft so that rotation of said splined shaft rotates said print wheel, means connected between said splined shaft and said print wheel to provide rocking motion to said print wheel to cause said print wheel to contact with the chart, a cycle selector, manually adjustable means for adjusting said cycle selector to print one or all or any intermediate number of the type characters on said print wheel, and means connecting said cycle selector to said splined shaft so that said cycle selector is driven by said splined shaft.

7. In an instrument for recording a plurality of records on a chart in response to one or more of a plurality of variables measured by said instrument, a chassis, a continuously rotating drive motor mounted in said chassis, means driven by said drive motor for converting continuous rotation into intermittent rotation, a splined shaft mounted for rotation in said chassis and intermittently rotated by said means, a print wheel having a plurality of type characters on it and mounted for freely rocking motion on said splined shaft, gearing connecting said print wheel to said splined shaft so that rotation of said splined shaft rocks said print wheel and causes one of the type characters on said print wheel to contact with the chart, a cycle selector adapted to select the type character to be printed on said chart, a rocker arm and channel pivotally mounted on said splined shaft and connected to said print wheel to provide said rocking motion to said print wheel, an ink-and-print cam driven by said motor and connected to drive said rocker arm and said channel so as to cause the selected type character to be printed on said chart, an electric switch actuated by said cycle selector, a second electric switch connected under the control of said first mentioned electric switch and controlling the speed of said drive motor, when activated at high speed, rotating said ink-and-print cam at high speed and thus causing said rocker arm to overshoot the slot in the ink-and-print cam, which slot causes the printing, and thus thence prevents the printing of type character selected.

8. In a recorder for printing records on a chart, a chassis, a print carriage mounted on the chassis, a rocking part mounted on the carriage, a print wheel mounted on the rocking part, an ink pad wheel rotatably mounted independently and in spaced-apart relation to the print wheel on the chassis, ink pads on said ink pad wheel, the print wheel being positioned adjacent the ink pad wheel for sequential rocking movement with the rocking part into physical engagement with the ink pad wheel and thence into physical engagement with the chart to make a printed record thereon and driving means on the chassis to simultaneously rotate the ink pad wheel and said print wheel.

References Cited by the Examiner

UNITED STATES PATENTS

| | | | |
|---|---|---|---|
| 1,755,449 | 4/30 | Marder | 346—46 |
| 2,125,345 | 8/38 | Hunt | 346—46 |
| 2,358,243 | 9/44 | Moore | 346—31 |
| 2,392,916 | 1/46 | Gruss | 346—32 |
| 2,423,480 | 7/47 | Caldwell | 346—32 |
| 2,628,149 | 2/53 | Blakeslee | 346—32 |
| 2,655,426 | 10/53 | Barnes | 346—32 |
| 2,761,068 | 8/56 | Geisler | 250—51.5 |
| 2,791,481 | 5/57 | Jordan | 346—45 |
| 2,837,397 | 6/58 | Frachon | 346—46 |

LEYLAND M. MARTIN, *Primary Examiner.*